Figure 1:
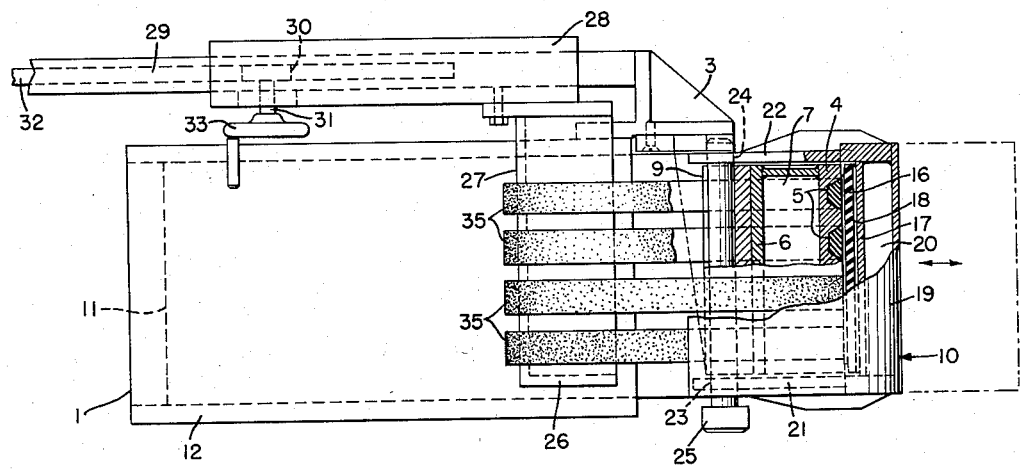

April 16, 1963  A. P. WACH  3,085,287
BELT CURING APPARATUS
Filed Dec. 8, 1959

INVENTOR.
ANDREW P. WACH
BY
J. B. Holden
ATTORNEY

United States Patent Office
3,085,287
Patented Apr. 16, 1963

3,085,287
BELT CURING APPARATUS
Andrew P. Wach, Lincoln, Nebr., assignor to The Goodyear Tire & Rubber Company, Akron, Ohio, a corporation of Ohio
Filed Dec. 8, 1959, Ser. No. 858,213
3 Claims. (Cl. 18—6)

This invention relates to an apparatus for vulcanizing belts and more particularly to an apparatus for sectionally vulcanizing V-belts or the like.

Sectional curing of belts is a technique that is well known for vulcanizing belts, particularly endless belts having a length that makes it impractical to vulcanize in one operation on a mold ring. The size of the heater or vulcanizing equipment places a definite limit on the length of belt that can be vulcanized on the equipment normally used for endless belts. For belts of this category, the usual technique has been to vulcanize them sectionally, that is, a portion of the length, in a flat press then repeat this with another section until the entire length of belt is vulcanized. Preferably, a section of the mold cavity adjacent each end of the press is maintained at a much lower temperature than the remainder of the cavity to avoid overcure or over vulcanization at the press lap. This is a well-known practice in the art.

The aforementioned method of vulcanizing long length belts, particularly V-belts, has the great disadvantage of introducing substantial internal stresses when the belt is trained around small diameter pulleys after being vulcanized straight. In addition, the press equipment required to vulcanize in this manner, requires considerable capital investment as well as substantial floor space areas for efficient operation.

It also has been a problem for some time to efficiently produce V-belts which have a wide cross-section and relative short length such as those used for some variable speed drives. Such belts have caused difficulty in loading and unloading from the molds so that the belt is not damaged. It also has been difficult to obtain the proper uniform tension on the tension section of the belt. It is, therefore, an object of this invention to provide an apparatus for vulcanizing belts that permits accurate control of the tension in all portions of the tension section of the belt during vulcanization.

Another object of the invention is to provide an apparatus for vulcanizing belts that is more economical in cost and requires less floor space than that which is ordinarily used.

A further object of the invention is to provide an apparatus that may be readily adapted to receive molds for different belt sections without substantial capital investment.

A still further object of the invention is to provide an apparatus that produces a better and more uniform belt.

Another primary object of the invention is to provide an apparatus that will provide a predetermined pressure to each section of a belt as it is sectionally vulcanized.

Other objects and advantages of this invention will become apparent hereinafter as the description thereof proceeds, the novel features, arrangements and combinations being clearly pointed out in the specification as well as the claims thereunto appended.

In the drawings:
FIG. 1 is a plan view of the apparatus of the invention; and
FIG. 2 is an elevation of the apparatus of the invention.

Figure 2:
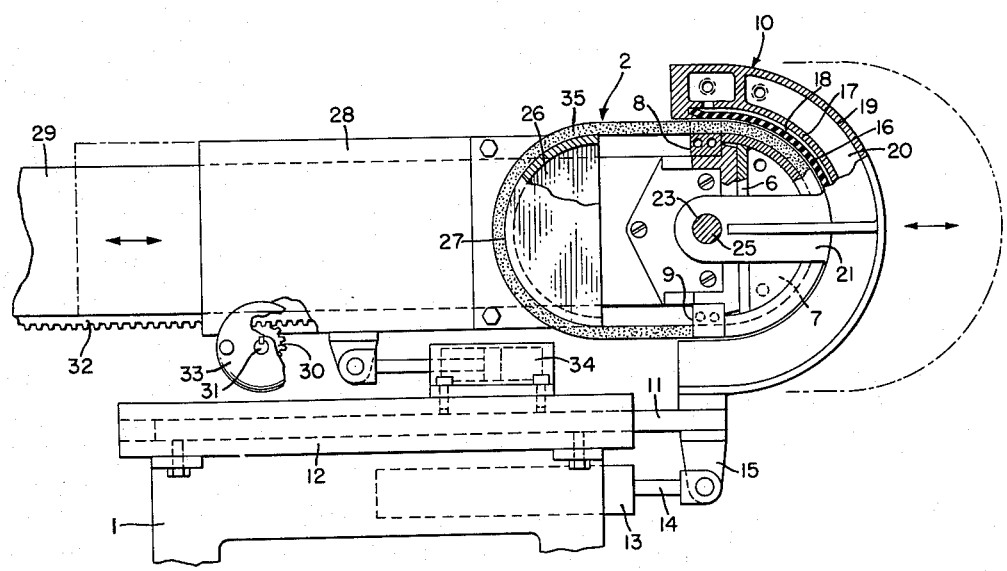

In FIGS. 1 and 2, a base 1 supports the mold in apparatus 2 used to vulcanize a section of a V-belt or V-belts. Attached to the base 1 by means of a bracket 3 is an arcuate mold section 4 having the cavities 5 therein which extend the entire peripheral length of the mold section.

For the purposes of illustration, four belt vulcanizing cavities 5 are shown in mold section 4 but it is readily apparent that the number of cavities may be varied as desired. In some instances, a single cavity will be desirable particularly for wide cross-section belts. As shown, the mold section 4 is semi-circular and covers an arc of 180° although this may be varied to meet the particular requirements of the belts to be vulcanized therein. Extending between the opposite sides of the mold section 4 near the ends of the arcuate portion a plate 6 is attached to form an airtight and pressure-tight chamber 7 into which the heating medium such as steam is introduced so that the cavity portion is heated to vulcanize the belt sections therein. If preferred, other means of heating the mold section 4 may be used.

Adjacent each end of the arcuate section are tangential straight sections 8 and 9 which also have cavities corresponding in contour and extensions of those in the arcuate section 4. Each of the straight sections 8 and 9 are cored or include a passage therethrough into which a cooling medium such as water is passed during the vulcanization of the belt.

Surrounding the arcuate mold section 4 and straight sections 8 and 9 is a hood member 10 which, as shown, is attached to guide plate 11 with the edges engaging ways 12 attached to base 1. The guide bars 11 and ways 12 provide means to move the hood horizontally away from the mold section 4 so that belts can be removed or inserted in the mold cavities. As shown, a hydraulic cylinder 13 is fixed to the base 1 with the end of the piston rod 14 attached to projection 15 of the hood as means to move the hood horizontally along ways 12 as indicated by the arrows in FIGS. 1 and 2. It is apparent that various mountings of the hood 10 may be used to provide for positioning of the hood during the operation of the apparatus. As shown, hood 10 includes a flexible diaphragm 16 of rubber or rubber-like material on the inner surface mounted so that the diaphragm lies adjacent the periphery of the mold section 4 when the hood is in the position illustrated in FIG. 2. Lying immediately behind the diaphragm and having an arcuate contour similar to that of the mold section and diaphragm, is a rigid member 17 forming a narrow chamber 18 between the diaphragm 16 and the rigid member 17. Spaced outwardly from rigid member 17 is a second rigid member 19 forming chamber 20 between rigid members 17 and 19. The chambers 18 and 20 are pressure tight when in use so as to retain fluid pressure.

Extending radially inwardly from the end of hood 10 are arms 21 and 22 which straddle the ends of the mold section 4. On the inner end of the arms 21 and 22 are aligned openings 23 and 24 through which a pin 25 is inserted when the hood is positioned around the mold section 4. The pin 25 locks hood 10 in position around mold section 4 during the vulcanizing operation.

Movably mounted on the base 1 is a second arcuate section 26 having arcuate surface 27 facing in the opposite direction to that of the mold 4. As shown, the arcuate section 26 is mounted on guide plate 28 which engages way 29 to provide for movement of the arcuate section with respect to mold section 4. As seen in FIG. 2, a pinion gear 30 mounted on shaft 31 engages the rack 32 so that by rotating the hand wheel 33 the arcuate section 26 may be positioned quickly by the operator.

As shown, the arcuate surface 27 of arcuate section 26 is a plain surface which engages the inner periphery of the belts, but if desired, it is apparent that cavities similar to those in the arcuate surface of mold 4 may be formed in the surface to assist in maintaining accurate alignment of the belts during vulcanization. In order to provide a uniform and controlled tension on the belts when they are positioned in the cavities of the mold section 4 and around arcuate section 26, a hydraulic cylinder 34 maintains a constant force in urging the movable member 26 away from the mold section 4. Thus the belts 35 are subjected to a uniform tension continuously during vulcanization.

In operation of the apparatus, the hood 10 is moved to the position indicated by the dotted lines in FIGS. 1 and 2 so that the mold section 4 is exposed. The movable arcuate section 26 is moved toward mold section 4 to a point where the belts 35 to be vulcanized can be placed in the cavities 5 of the mold 4 and around the arcuate section 26. The movable arcuate section 26 is then moved horizontally away from the mold section 4 to the approximate final position, and then the hydraulic cylinder 34 is then activated to maintain the belts 35 under the desired tension during vulcanization. The hood 10 is then moved into the closed position as indicated in FIGS. 1 and 2 and pin 25 is inserted in openings 23 and 24 of the arms 21 and 22. A fluid pressure such as air is then introduced in the chamber 18 between the diaphragm 16 and the rigid member 17 to move the diaphragm 16 into contact with the outer surface of the belts 35. This will urge the unvulcanized belts 35 into cavities 5 of mold section 4 so that they will be properly formed. The pressure on the diaphragm 16 is maintained throughout to confine the belts and maintain a uniform pressure on them throughout the vulcanizing period. A heating medium such as steam is introduced into the chamber 7 of the mold section 4 to maintain the temperature in the cavities 5 of the mold section 4 at the desired vulcanizing temperature. If desired, a heating fluid may be introduced also into the chamber 20 during the vulcanizing period to provide a more uniform heat.

In order to prevent "press lap" which occurs at the end of the vulcanized section during the vulcanizing of the subsequent section, a cooling medium such as water is introduced into the tangential straight sections 8 and 9 during the vulcanizing period. The maintenance of lower temperatures in this section of the mold will prevent complete vulcanization in this area and in the vulcanization of the subsequent sections the vulcanization of these sections is completed. This technique is a well-known practice in sectional curing and, therefore, is only briefly described.

After vulcanization of the section of the belts lying in cavities 5 the hood 10 is moved away from the mold section 4 and the pressure of the hydraulic cylinder 34 is released. The moveable arcuate section 26 is then moved toward the mold section 4 a distance sufficient so that the belts 35 can be released from the cavities 5. The belts are then turned or pulled through the cavities to position the adjacent section in the cavity. The above enumerated steps are then repeated and in many instances several steps of vulcanization will be required to vulcanize the complete length of the belt.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. In an apparatus for vulcanizing an endless belt comprising a pair of arcuate vulcanizing mold sections to receive a belt therearound with the arcuate surface of each section facing outwardly away from the other section, a cavity on the outer periphery of one of said mold sections to receive a portion of the belt for vulcanizing, said cavity extending the entire peripheral length of said section and having a cross section comparable to that desired in the vulcanized belt, fluid pressure means to move said other section relative to said first-mentioned section to subject initially the belt positioned therearound to a predetermined tension and being continuously operable throughout the vulcanization of the belt to maintain said predetermined tension on said belt, a pressure applying member having an expansible portion in the vulcanizing position cooperating with and substantially coextensive with said first-mentioned section to immovably confine the belt in the cavity therein, said pressure applying member being mounted for movement into position adjacent said first-mentioned section for vulcanizing of said belt, fluid pressure means attached thereto for moving said pressure member into and away from said vulcanizing position adjacent said first-mentioned section, locking means operable to retain said pressure member in the vulcanizing position after movement thereinto, means to introduce fluid pressure behind said expansible portion of said pressure member to urge said expansible portion against the outer periphery of said first-mentioned section to immovably confine the belt under pressure in said cavity during vulcanization and a source of heat for said first-mentioned arcuate section to vulcanize the portion of the belt confined in the cavity thereof.

2. In an apparatus for vulcanizing an endless belt comprising a pair of arcuate vulcanizing mold sections to receive a belt therearound with the arcuate surface of each section facing outwardly away from the other section, a cavity on the outer periphery of one of said mold sections to receive a portion of the belt for vulcanizing, said cavity extending the entire peripheral length of said section and having a cross section comparable to that desired in the vulcanized belt, fluid pressure means to move said other section relative to said first-mentioned section to subject initially the belt positioned therearound to a predetermined tension and being continuously operable throughout the vulcanization of the belt to maintain said predetermined tension on said belt, a pressure applying member with an expansible arcuate portion thereof substantially corresponding to and coextensive with the outer periphery of said first-mentioned arcuate section, said pressure member being mounted for movement into position adjacent said first-mentioned section for vulcanization of said belt, a fluid pressure cylinder attached thereto for moving said pressure member into and away from said vulcanizing position adjacent said first-mentioned section, locking means operable to retain said pressure member in the vulcanizing position after movement thereinto, means to introduce fluid pressure behind said expansible portion of said pressure member to urge said expansible portion against the outer periphery of said first-mentioned section to immovably confine the belt under pressure in said cavity during vulcanization and a source of heat for said first-mentioned arcuate section to vulcanize the portion of the belt confined in the cavity thereof.

3. In an apparatus for vulcanizing endless belts, a first arcuate mold section, a movable arcuate section positioned with the arcuate surface facing outwardly away from the arcuate surface of said first section, each section having an arc of of substantially 180°, fluid pressure means to move said movable section relative to the first section to subject belts positioned therearound to a predetermined tension and being continuously operable throughout the vulcanization of the belts to maintain said predetermined tension on said belts, a tangential straight section at each end of said first arcuate section, cavities in the outer periphery of said first section and said tangential sections to receive portions of the belts for vulcanization, said cavities extending throughout the peripheral length of said section and tangential sections with a cross-section comparable to that desired in the vulcanized belts, a hood having a flexible diaphragm forming an expansible arcuate portion substantially corresponding to and coextensive with the outer periphery of said first arcuate section, said hood being mounted for movement in a direction parallel to the radius normal to the base line of said first arcuate section to a position adjacent said first arcuate section during vulcanization of said belts, a hydraulic cylinder attached to said hood for moving said hood into and away from said vulcanization position, locking means to retain said hood in said vulcanizing position after movement thereinto, means to introduce fluid pressure behind said diaphragm to urge the diaphragm against the outer peripheral portion of said first arcuate section and into contact with the outer surface of the belts in said cavities to immovably confine and subject the belts to pressure during vulcanization thereof and means to heat said first arcuate section to vulcanize the portions of the belts confined in the cavities thereof.

References Cited in the file of this patent

UNITED STATES PATENTS

| | | |
|---|---|---|
| 1,579,718 | Kuhlke | Apr. 6, 1926 |
| 1,707,794 | Blaker | Apr. 2, 1929 |
| 2,093,922 | Meyer | Sept. 21, 1937 |
| 2,253,792 | Leavenworth | Aug. 26, 1941 |
| 2,325,204 | Kilborn | July 27, 1943 |
| 2,522,359 | Haren | Sept. 12, 1950 |
| 2,600,775 | Hurry et al. | June 17, 1952 |